TRANSMITTED PULSE

RECEIVED PULSES

TRANSMITTED PULSES

RECEIVED PULSES

United States Patent Office 3,426,281
Patented Feb. 4, 1969

3,426,281
RECEPTION OF TIME DISPERSED SIGNALS UTILIZING IMPULSE RESPONSE STORAGE IN RECIRCULATING DELAY LINES
Theodore J. Klein, Atlantic Highlands, N.J., assignor to the United States of America as represented by the Secretary of the Army
Filed Feb. 28, 1966, Ser. No. 532,542
U.S. Cl. 325—324           7 Claims
Int. Cl. H04b 1/10; H04l 27/24

ABSTRACT OF THE DISCLOSURE

A receiver for eliminating distoration due to multipath reflections in the transmission of high speed pulse data via a high frequency modulated carrier wave. The received data signal is demodulated, sampled, digitized, and stored in time compressed form in an array of recirculating delay lines. This received data signal is then correlated with a previously received, digitized, time compressed and stored impulse response of the transmission medium.

---

The present invention relates to the reception of high speed radio-telegraph signals and more particularly to improved receiver circuitry for processing high speed pulse data which has been transmitted on a high frequency carrier wave. Multipath effects caused by multiple reflections of high frequency carrier waves from the fluctuating ionosphere render long distance radio reception difficult. This is particularly true in the case of pulse type transmission. The multipath effects cause time dispersion of the pulses, resulting in the reception of a number of pulses for each transmitted pulse. The dispersion is caused by the differential transit times of the pulse over the multiple path lengths from transmitter to receiver. Without special receiving equipment, the rate of pulse transmission must be slow enough so that the last "echo" of a given pulse arrives at the receiver before the next succeeding pulse arrives via its shortest path. This problem is complicatd by the fact that the impulse response of the transmission medium changes with time and with movement of the transmitter or receiver. The term "impulse response" refers to the pattern of received pulses resulting from the transmission of a single pulse through the dispersive medium. In the prior art it has been known to measure this impulse response by temporarily storing the received pattern resulting from a single transmitted probe pulse and then correlating the stored impulse response with subsequently received time dispersed high speed pulse data to extract the transmitted pulse train therefrom. Examples of such a system are found in the Di Toro Patents 2,935,604, and 3,206,688 issued on May 3, 1960 and Sept. 14, 1965 respectively. The present invention comprises improved receiver circuitry for performing the correlation of the received signal with the stored impulse response. Briefly stated, the circuitry of the present invention comprises means to receive and demodulate a high frequency pulse modulated carrier wave signal, means to sample and digitize the demodulated signal at the transmitted pulse rate or a multiple thereof, means to time compress the digitized samples by means of a first array of recirculating delay lines, means to transfer the impulse response of the transmission medium to a second array of recirculating delay lines, and means connected to the outputs of both sets of delay lines to correlate the impulse response from said second array of delay lines with the subsequently received high speed pulse data from said first array of delay lines. The impulse response is periodically updated by the transmission of a new probe pulse. The time compression feature permits the use of shorter delay lines than would be otherwise required and the digitizing of the incoming signal eliminates errors caused by the attenuation of an analog signal as it traverses a delay line.

It is thus an object of this invention to provide improved circuitry for processing received pulse type radio signals which have suffered distortion because of time dispersion due to multipath effects.

Another object of the invention is to provide improved circuitry for processing pulse trains in which the individual pulses are overlapping due to multipath effects during the transmission thereof.

A further object of the invention is to provide an improved radio-telegraph receiver.

These and other objects and advantages of this invention will become apparent from the following detailed description and drawings, in which.

Figure 1:
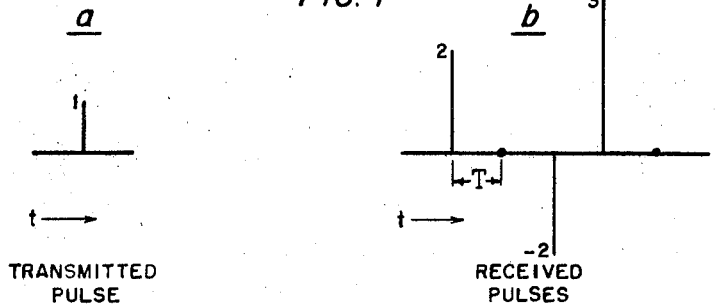
FIGS. 1 and 2 are diagrams showing the effects of multipath transmission on a single probe pulse (FIG. 1) and on a train of rapidly transmitted pulses (FIG. 2).
Figure 2:
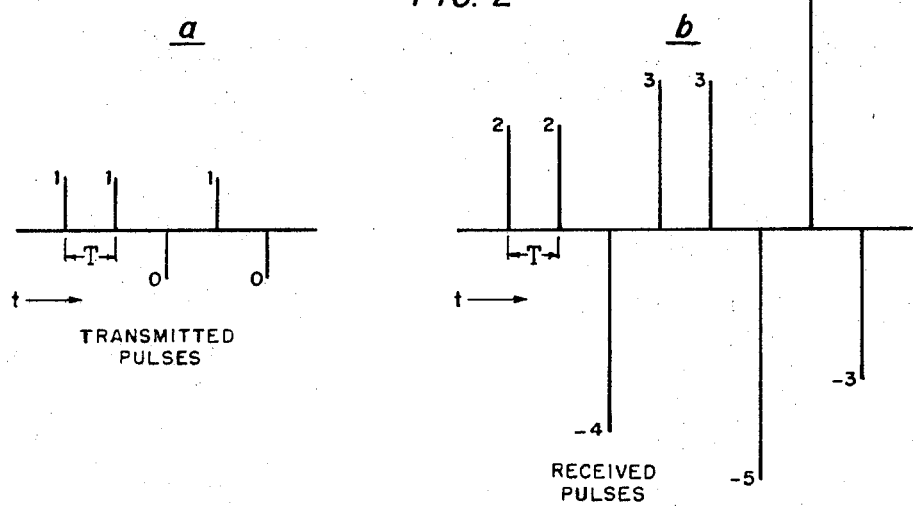

The invention is illustrated in connection with a phase-modulated binary pulse radio-telegraph system in which a high frequency carrier wave of one phase represents a mark or "1" binary signal and the same carrier wave in the opposite phase represents a "0" or space binary signal. Thus in the demodulated pulse train, as 1 is represented by a pulse of one polarity and a 0 a pulse of opposite polarity. In such a system the different path lengths taken by a single transmitted pulse will cause multiple received pulses which will generally differ both in amplitude and phase. FIG. 1b represents a typical impulse response of the transmission medium to the single transmitted probe pulse shown in FIG. 1a. The received pulse sequence 2, 0, −2, 3, 0 of FIG. 1b therefore represents the impulse response of the medium to the probe pulse of FIG. 1a. The received signal is sampled at the rate of 1/T in the illustarated example with the result that the spacing T of the pulses of FIG. 1b is the same as the spacing between pulses of the subsequently transmitted data pulse train of FIG. 2a. T is therefore the baud length and the reciprocal of the bit transmission rate. It can be seen that the medium disperses a single transmitted pulse over a time interval equal to 5T or five bauds. FIG. 2b illustrates the received signal which results from the transmitted signal of FIG. 2a over a medium whose impulse response is that of FIG. 1b. The waveform of FIG. 2b bears little resemblance to the transmitted signal of FIG. 2a, however if the impulse response (FIG. 1b) and the transmitted signal (FIG. 2a) are known, the dispersed and overlapping received signal can be predicted in the following manner: Since the first bit of the impulse response is +2, the first 1 bit of the transmitted signal will be received as +2. During the second baud or time slot at the receiver, the second transmitted 1 bit will also arrive as +2. Since the second bit of the impulse response is zero, there will be no echo of the first transmitted 1 bit during the second baud at the receiver. During the third baud the received signal is −4, this is a composite of the first transmitted 0 bit which is now arriving via its shorted path as a −2. This follows because the probe pulse, of opposite phase to a 0, arrived as a +2 via its shorted path. At the same time, during the third baud at the receiver, an echo of the first transmitted 1 pulse arrives as −2, because the third pulse of the impulse response is −2. There is no effect of the second transmitted 1 pulse during the third baud at the receiver because the second pulse of the impulse response is zero. Thus these two simultaneously received −2 signals during the third baud combine to yield a received signal of −4. The received signal during the fourth baud at the receiver is +3. It can be shown that this +3 is a composite of: (1) a +3 signal due to the second echo of the first transmitted 1 signal, (2) a −2 signal due to the first echo of the second transmitted 1 signal, (3) a +2 signal caused by the fourth bit (1) of the transmitted signal arriving via its shortest path. By similar synthesis the remainder of the received signal can be built up, given the transmitted signal and the impulse response. Conversely, if the impulse response and received signal are known, the transmitted signal can be deduced therefrom by a correlation process. The novel receiving circuitry of FIG. 3 accomplishes such a correlation.

Figure 3:
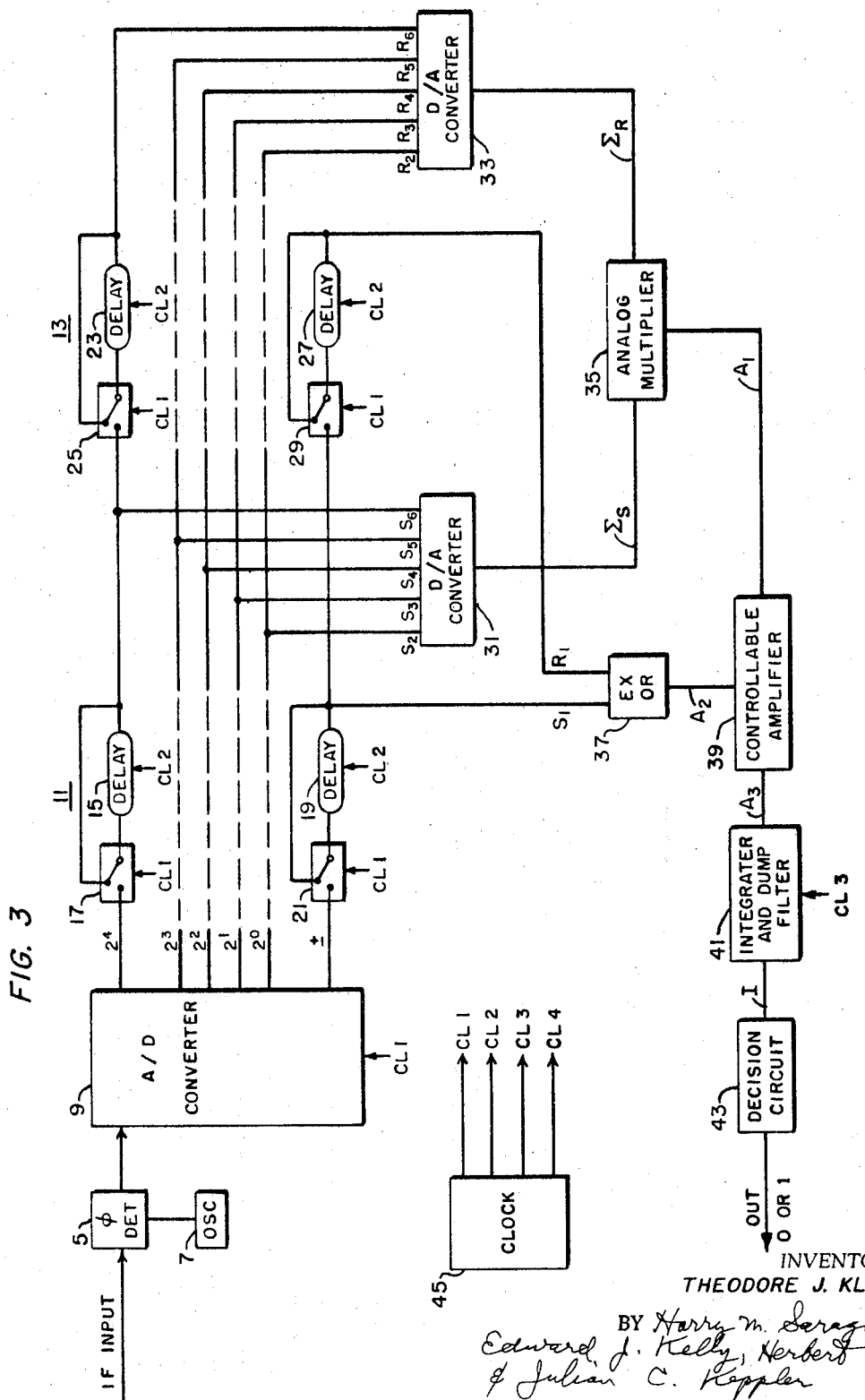
FIG. 3 is a block circuit diagram of an illustrative embodiment of a receiver embodying the principles of the present invention.

In FIG. 3, the received phase-modulated HF signal is converted to an intermediate frequency by means of conventional circuitry, not shown. The IF signal is applied to phase detector 5 which demodulates the signal by comparing its phase to synchronized local oscillator 7. The demodulated signal is then applied to analog-to-digital converter 9 which is controlled by clock pulses supplied to input CL1 from clock 45. The converter 9 samples the demodulated signal from 5 at intervals spaced by T seconds, the transmitted signal baud length, and converts each sample to a digital number comprising a sign bit plus 5 magnitude bits. The digitized output of the converter 9 appears on the 6 lines labeled $\pm$, $2^0$, $2^1$, $2^2$, etc. and applied to an electronic switch, two of which 17 and 21 are shown. The outputs of the electronic switches are applied to an equal number of delay lines 11, two of which, 15 and 19, are shown. The output of each delay line is connected to one of its associated electronic switch terminals, to provide for recirculation through the delay lines. The purpose of the delay line and switch array 11 is to compress and process the digitized output of the converter 9. Each of these delay lines is made shorter than the baud length T. The exact length or time delay is made equal to $(D-1)T/D$, where D is the maximum dispersion to be compensated for. D is five in the case illustrated in FIGS. 1 and 2. The clock input CL1 to each of the switches 17 and 21 operates at the data transmission rate of 1/T and the clock input to each of the first array of delay lines 11 operates at a frequency of D/T to establish $D-1$ time slots in each of the delay lines. The electronic switches are normally connected as shown to provide recirculation from the output to the input of each delay line, but once during each baud all of the switches momentarily contact in unison the other terminals connected to the converter to apply the outputs thereof to the delay line inputs. Due to the relationship between the delay line lengths and the timing of the clock pulses CL1 applied to the switches 17, 21, etc., any pulse applied to any delay line will reach the output thereof and be recirculated just prior to the next succeeding closure of the switches during the next baud. In this manner, after all the time slots in the delay lines 11 become full, one new bit from the converter 9 will enter each delay line during each baud and one bit will be lost from the output end thereof as it is read out to the succeeding correlation circuitry. The length of the time slots within the delay line is such that five bits are compressed into the time period T occupied by one bit of information during transmission. This time compression feature permits the use of proportionally shorter delay lines. After the first array of delay lines 11 has been filled with the compressed digitized received signal representing the impulse response, these five bits are transferred to the second array of delay lines 13, two of which 23 and 27 are shown in FIG. 3. This transfer is accomplished by connecting electronic switches 25, 29, etc. for a period equal to T seconds to the outputs of the first array of delay lines and thereafter returning the switches 25, 29, etc. to the recirculating posiion, as shown. The second delay line array 13 is similar to the first array except that each delay line has a delay or length of T seconds. The result is that the 5 compressed pulses forming the impulse response will be recirculated indefinitely therein with no precession. The outputs of the two arrays of delay lines are then correlated by means of the rest of the circuitry. Correlation involves multiplication followed by integration. The output of delay line 19 carrying the sign data bit is also applied as one input of Exclusive-OR gate 37, the other input of which is the output of corresponding delay line 27 of the second delay line array. The gate 37 is arranged to control the sign of the product of the multiplication of the magnitudes of the data outputs of the two arrays of delay lines. The gate 37 output, $A_2$, is one type of signal (0 or 1) if its two inputs are the same and the opposites type if its two inputs are ent. The $A_2$ signal is applied to controllable amplifier 39 and either inverts or does not invert the signal passing therethrough from analog multiplier 35 in accordance with the output of gate 37. The output $A_3$ of 39 is therefore properly polarized in accordance with the sense or polarity of the product signal. The remainder of the outputs of the first array of delay lines are applied to the digital-to-analog converter 31. The lines $S_2$ through $S_6$ represent the magnitude bits $2^0$ through $2^4$ forming the outputs of the delay lines connected thereto. Similarly, the remainder of the delay lines of the second array are connected as inputs $R_2$ through $R_6$ of digital-to-analog converter 33. The converters 31 and 33 have outputs $\Sigma_s$ and $\Sigma_r$ respectively which are proportional to the decimal or analog value of the binary input thereto. The analog multiplier produces an output $A_1$ equal to the product of its two inputs. The sign of the product is applied as the signal passes through controllable amplifier 39, as already explained. The remainder of the correlation process comprises the integration of the product signal $A_3$ over a period of time equal to the baud length T, in integrate-and-dump filter 41. The filter 41 is reset, or dumped after each 5 bauds by means of the clock input CL3 applied thereto. The polarity of the output I of filter 41 yields the transmitted signal, a positive output indicating a 1 and a negative output a 0. The decision circuit 43 senses the polarity of the integrated output of 41 and puts out a 0 or 1 signal in accordance therewith.

Figure 5:
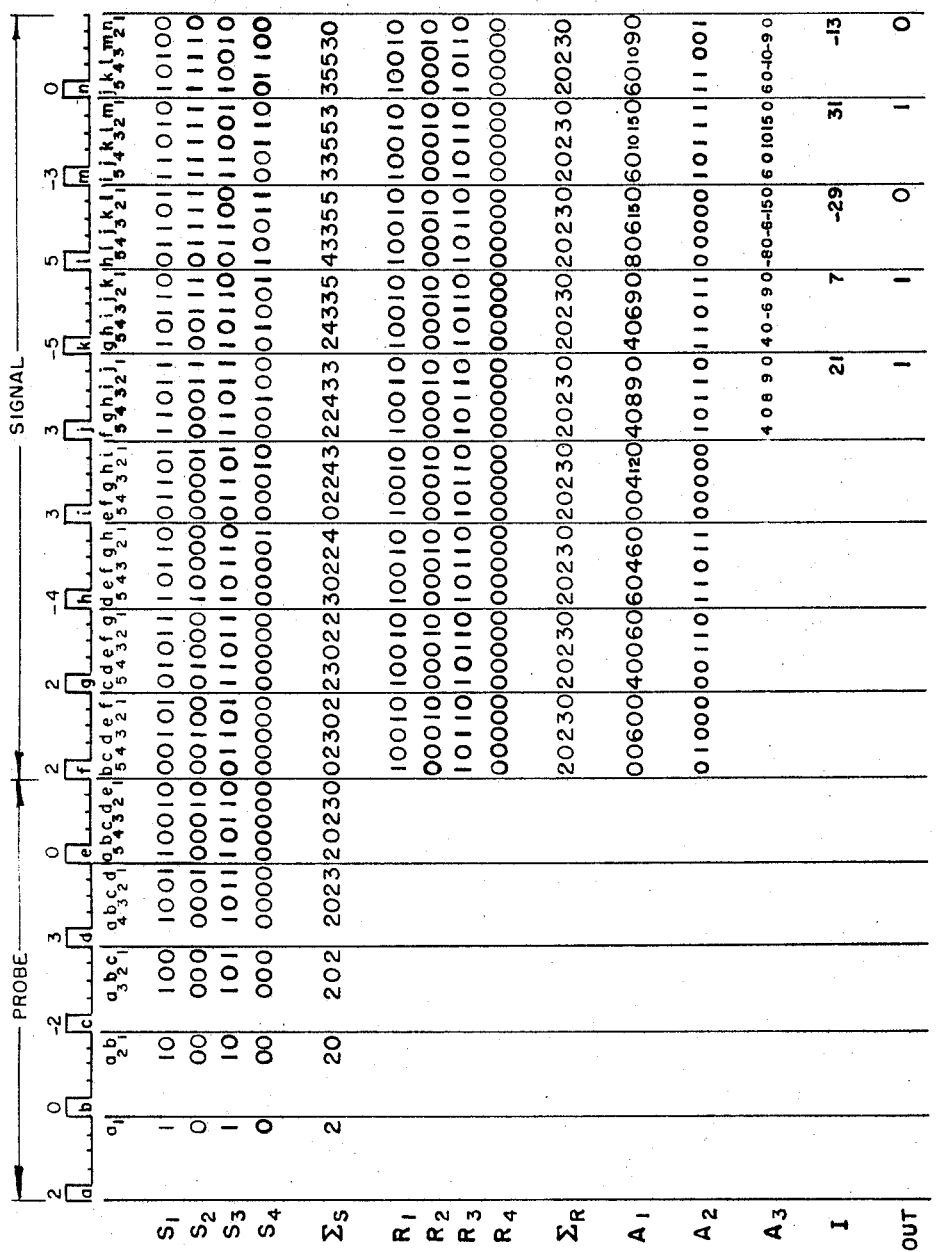
FIG. 5 is a tabulation which illustrates the processing of the signals of FIGS. 1 and 2 by the circuitry of FIG. 3.

The tabulation of FIG. 5 traces the flow of the impulse response of FIG. 1b and the subsequently received signal of FIG. 2b through the receiving circuitry. Fourteen vertical columns are shown in this figure, labeled a through n. The first five of these columns represent the received impulse response, 2, 0, −2, 3, 0 and the remainder of the intelligence signal 2, 2, −4, 3, 3, −5, 5, −3, 0 of FIG. 2b. In the first column, the first 2 pulse of the probe signal is shown in digital form as 1010 corresponding to the signals on the lines $S_1$ through $S_4$ of FIG. 3. At the end of the first baud the signal $a_1$ will be emerging from the first array of delay lines to be recirculated. At the end of the second baud the $b_1$ signal will emerge from the first delay line array preceded by the $a_2$ signal. The subscripts represent the number of times a given pulse has traversed the delay lines. After the reception of the last pulse of the impulse response, the entire impulse response is stored in the first array of delay lines in compressed form, as indicated in the fifth column. It should be noted that since the maximum signal magnitude is 5, only three lines $S_2$, $S_3$, and $S_4$ are required to digitize the signal, the $S_1$ line indicating polarity. In the sixth column, the impulse response has been transferred and stored in the second array of delay lines. This data is shown opposite the letters $R_1$ through $R_4$ corresponding to the similarly referenced lines of FIG. 3. It can be seen that the impulse response repeats itself in the succeeding columns due to its recirculation in the second array of delay lines. The information in the first array of delay lines however, does not repeat itself, but precesses to add the newly received pulse during each baud and also to drop the oldest bit circulating therein. This is caused by the choice of the delay line length and clock frequency, as explained above. Thus as the first pulse of the signal $f$ is applied to the first array of delay lines, the first pulse of the impulse response $a$ is dropped from the delay lines. The row labeled $\Sigma_s$ corresponds to the output of the digital-to-analog converter 31 of FIG. 3 and is merely the decimal equivalent of the binary numbers in the output of the first delay line array. Likewise, the row labeled $\Sigma_r$ is the output of digital-to-analog converter 33. The row labeled $A_1$ represents the product of $\Sigma_s$ and $\Sigma_r$ and $A_2$ the polarity or sign of each of the products in the same vertical column therewith. Since the illustrated circuit is designed to accommodate an impulse response up to five bauds, it is necessary to receive and correlate the first five pulses (f through j) of the intelligence signal before the first transmitted signal pulse can ge determined. Hence the output of the filter 41 and decision circuit 43 is disregarded until the j pulse of the tenth vertical column is received. In this column it can be seen that all of the product signals $A_3$ (4, 0, 8, 9, 0) are positive and therefore the filter 41 will have a positive output which will yield a 1 at the output of decision circuit 43. During the following baud the input $A_3$ to filter 41 is 4, 0, −6, 9, 0 which yields a +7 after integration. This results in a second 1 out of circuit 43. Similarly, all of the products during the next baud are of negative polarity yielding a zero output. The last two output signals are 1 and 0. Note that integrate and dump filter 41 algebraically adds each group of five product signals $A_3$ and the sign or plarity of the sum determines the output.

In the event that the received signals are sampled at multiple of the data transmission rate of $1/T$, the impulse response would contain proportionally more bits. If the received signal is sampled at the rate of $n$ times the data transmission rate, the clock input CL1 to converter 9 would operate at a frequency of $n/T$, the delay lines of the first array 11 would have lengths of $(nD-1)T/nD$, the clock input CL2 to both arrays of delay lines would operate at a frequency of $nD/T$ to establish $nD-1$ time slots in the first array of delay lines. The second array of delay lines would have a length equal to T, as in the illustrated case, but would contain $nD$ time slots.

Figure 4:
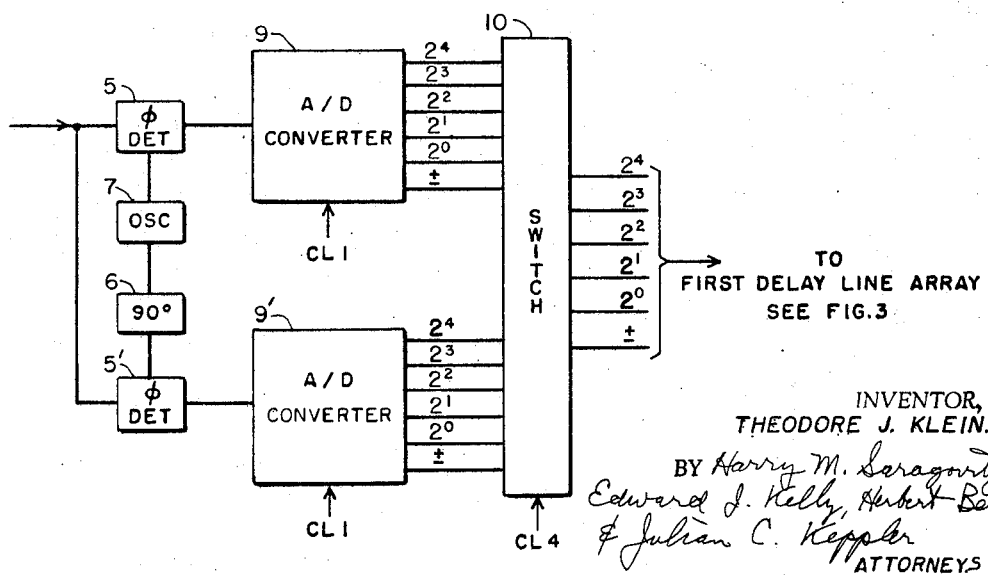
FIG. 4 is a modification of the circuit of FIG. 3.

The receiving circuitry of FIG. 3 may be modified as shown in FIG. 4, wherein similarly referenced elements perform the same function as in FIG. 3. In this modification, an additional phase detector 5', similar to detector 5 is utilized, and the local oscillator signal applied thereto is shifted 90° by means of phase shifter 6. The output of the second phase detector is applied to a second analog-to-digital converter 9', similar to converter 9. The switch 10 alternately connects the outputs of the two converters 9 and 9' to the first delay line array, shown in FIG. 3, under the control of a clock pulse CL4. The rest of the receiver would be the same as in FIG. 3. The advantage of using a pair of phase detectors with phase displaced local oscillator signals is that no phase locking of the local oscillator with the oscillator with the transmitted signal is required. There would be then a minimum of two samples ($n=2$) of the received signal per baud and and the delay lines would include twice as much data, however the principle of operation would be same as described for the circuitry of FIG. 3.

While the invention has been illustrated in connection with illustrative embodiments, the inventive concepts disclosed herein are of general application, for example, the invention is applicable to any type of time dispersed pulse transmission such as troposcatter or time dispersive switched telephone systems.

What is claimed is:

1. A receiver for high frequency time dispersed pulse modulated carrier wave signals, comprising means to demodulate said carrier wave signals, means to sample and digitize said demodulated signal, means to time compress the digitized samples by means of a first array of recirculating delay lines, means to transfer a group of said digitized samples comprising the impulse response of the transmission medium from said first array of delay lines to a second array of delay lines, separate digital-to-analog converter means connected to the outputs of said first and second array of delay lines, and means to correlate the outputs of said digital-to-analog converter means.

2. The receiver of claim 1 in which said demodulated signal is sampled at the rate of $1/T$, where T is the transmitted baud length, each line of said first array of delay lines has a length equal to $(D-1)T/D$ and each line of said second set of delay lines a length equal to T, where D is the maximum dispersion to be compensated for.

3. The receiver of claim 1 in which said demohulated signal is sampled at the rate of $n/T$, where T is the transmitted baud length and $n$ is an integer, each line of said first array of delay lines has a length equal to $(nD-1)T/nD$ and each line of said second set of delay lines a length equal to T, where D is the maximum dispersion to be compensated for.

4. The receiver of claim 1 wherein said means to correlate comprises an analog multiplier having as its two inputs the outputs of said digital-to-analog converter means, and integration means connected to the output of said analog multiplier.

5. A receiver for high frequency phase modulated radio-telegraph signals which are overlapping due to multipath transmission, comprising means to demodulate said signals, means to digitize said demodulated signals, first and second arrays of delay lines, said first array of delay lines being adapted to compress and precess the output of said means to digitize, means to transfer the group of digitized pulses comprising the impulse response of the transmission medium to said second array of delay lines for recirculation therein, and correlation means connected to the outputs of both arrays of delay lines, said correlation means being adapted to correlate the impulse response from said second array of delay lines with subsequently received high speed intelligence signals from the output of said first array of delay lines.

6. The apparatus of claim 4 wherein said means to demodulate said signals comprises a phase detector in which the phase of said radio-telegraph signals is compared to the phase of a local oscillator synchronized in phase therewith.

7. The apparatus of claim 4 wherein said means to demodulate said signals comprises a pair of phase detectors one input of each being said radio-telegraph signals, the other input of one of said phase detectors being a local oscillator signal, and the other input of the other phase detector being said local oscillator signal shifted in phase by ninety degrees; and in which said means to digitize said demodulated signals comprises a pair of analog-to-digital converters separately connected to the outputs of said phase detectors, and switch means connected between said converters and said first array of delay lines for alternately applying the outputs of said converters to said first array of delay lines.

References Cited

UNITED STATES PATENTS

| | | | |
|---|---|---|---|
| 3,071,739 | 1/1963 | Runyon | 325—42 X |
| 3,168,699 | 2/1965 | Sunstein, et al. | 325—42 X |
| 2,501,368 | 3/1950 | White | 325—159 |
| 3,038,154 | 6/1962 | Zworykin | 325—113 |
| 3,210,678 | 10/1965 | Hallock | 330—109 |
| 3,273,066 | 9/1966 | Ruhnke | 325—113 |
| 3,275,942 | 9/1966 | Ko-Hsin liu | 330—143 |
| 3,323,001 | 5/1967 | Mackellar | 307—88.5 |

ROBERT L. GRIFFIN, *Primary Examiner.*

J. A. BRODSKY, *Assistant Examiner.*

U.S. Cl. X.R.

178—67